(12) United States Patent
Kamiya et al.

(10) Patent No.: US 8,242,064 B2
(45) Date of Patent: Aug. 14, 2012

(54) SLIDING MEMBER

(75) Inventors: Soji Kamiya, Aichi (JP); Tasuku Sakurai, Saitama (JP); Mitsunori Arimura, Aichi (JP)

(73) Assignee: Taiho Kogyo Co., Ltd., Toyota-shi (JP)

( * ) Notice: Subject to any disclaimer, the term of this patent is extended or adjusted under 35 U.S.C. 154(b) by 444 days.

(21) Appl. No.: 12/444,300

(22) PCT Filed: Oct. 4, 2007

(86) PCT No.: PCT/JP2007/069476
§ 371 (c)(1),
(2), (4) Date: Jan. 5, 2010

(87) PCT Pub. No.: WO2008/044598
PCT Pub. Date: Apr. 17, 2008

(65) Prior Publication Data
US 2010/0144564 A1    Jun. 10, 2010

(30) Foreign Application Priority Data
Oct. 6, 2006    (JP) ................. 2006-275033

(51) Int. Cl.
*C10M 125/22*    (2006.01)
(52) U.S. Cl. ....................... 508/167; 508/108
(58) Field of Classification Search ........... 508/167, 508/108
See application file for complete search history.

(56) References Cited

U.S. PATENT DOCUMENTS

| | | | |
|---|---|---|---|
| 5,525,246 | A | 6/1996 | Kamiya et al. |
| 6,303,235 | B1 | 10/2001 | Kawakami et al. |
| 2003/0031389 | A1 | 2/2003 | Kanayama et al. |
| 2004/0062860 | A1 | 4/2004 | Nakashima et al. |
| 2005/0157964 | A1 | 7/2005 | Kawagoe et al. |

FOREIGN PATENT DOCUMENTS

| | | |
|---|---|---|
| EP | 1 236 914 A1 | 9/2002 |
| JP | 56-142839 A | 11/1981 |
| JP | 3-20451 B2 | 3/1991 |
| JP | 4-83914 A | 3/1992 |
| JP | 6-272715 A | 9/1994 |
| JP | 11-293368 A | 10/1999 |
| JP | 3133209 B2 | 2/2001 |
| JP | 2002-53883 A | 2/2002 |
| JP | 2002-61652 A | 2/2002 |
| JP | 2003-194144 A | 7/2003 |
| JP | 2003-222136 A | 8/2003 |
| JP | 2004-263727 A | 9/2004 |
| JP | 3733539 B2 | 1/2006 |

*Primary Examiner* — Jim Goloboy
(74) *Attorney, Agent, or Firm* — Birch, Stewart, Kolasch & Birch, LLP

(57) ABSTRACT

[Task] The solid-lubricant layer applied on the surface of Al or Cu-based bearing alloy is improved so as to satisfactorily demonstrate the properties of the solid lubricant.
[Means for Solution] The solid lubricant dispersed in the solid-lubricant solid-lubricant layer exhibits 85% or more of the relative C axis intensity ratio defined below.
The relative C axis intensity ratio=the accumulative intensity of (002), (004) and (008) planes relative to the accumulative intensity of (002), (004), (100), (101), (102), (103), (105), (110) and (008) planes detected by X ray diffraction.

2 Claims, 4 Drawing Sheets

SLIDING MEMBER

TECHNICAL FIELD, TO WHICH INVENTION BELONGS

The present invention relates to a sliding member, more particularly, a sliding member consisting of aluminum- or copper-based alloy and a solid-lubricant layer, which comprises the solid lubricant and is applied on the alloy. Specifically, the present invention relates to a sliding member used for the bearing and the like of an internal combustion engine.

BACKGROUND TECHNIQUE

Patent Document 1, Japanese Examined Patent Publication (kokoku) 3-20451 discloses aluminum-based bearing alloy based on the Al—Sn—Si fundamental components. This aluminum-based bearing alloy contains from 3 to 20% of Sn, from 0.1 to 1% of Zr, from 1.5 to 8% of Si, from 0.2 to 2% of one or more of Cu and Mg, and from more than 0.1 to 1% of at least one of V, Nb, Mo and Co plus Zr in total. The bearing alloy is in sliding contact with a hardened steel shaft of a cast-iron shaft. That is, no solid-lubricant coating is applied on the bearing alloy.

Aluminum-based bearing alloy, which is subjected to heavy load, is provided with an overlay, which is based on soft metal, such Sn, Pb and the like, in order to ensure compatibility. Patent Document 2, Japanese Unexamined Patent Publication (kokai) No 4-83914 proposes a solid-lubricant coating, which can substitute for the soft-metal based overlay. Subsequent improvements of this solid-lubricant based overlay have been published in Tribology Association of Japan under the title of "Aluminum Bearing Fitted With Solid-Lubricant Overlay" (1st through 4th series). This solid-lubricant layer of the bearing consists of from 90 to 55% by mass of the solid lubricant, such as $MoS_2$, BN, $WS_2$, graphite and the like, and from 10 to 45% by mass of the polyimide based binder. The solid lubricant may be replaced with from 1 to 20% by mass of the friction controlling agent, such as $CrO2$. The aluminum-based bearing alloy with the solid-lubricant overlay and the same alloy with the lead-alloy based overlay are tested to evaluate the fatigue resistance, the wear resistance and the seizure resistance. The experimental data of fatigue resistance and wear resistance of the former alloy is equivalent to those of the latter alloy. The seizure resistance of the former alloy is exceedingly superior to that of the latter alloy. The solid-lubricant layer of the aluminum-based bearing layer is prepared by spraying the solid lubricant, diluting agent and the polyimide-based binder, drying and baking. The solid-lubricant layer is bonded on the underlying aluminum alloy.

Patent Document 3, Japanese Patent No. 3,733,539 proposes an aluminum bearing with the solid lubricant overlay. The aluminum-based bearing alloy has from 1.0 μm to 4.3 μm of the surface roughness Rz. On this surface is applied a 3 to 8 μm thick solid-lubricant layer, which has 5 μm or less of surface roughness Rz and which consists of from 98 to 55% by mass of solid lubricant and from 2 to 45% by mass of the thermosetting resin. In the manufacturing method of the aluminum bearing with the solid lubricant overlay, the surface of the aluminum-based alloy bearing is cleaned, by for example, alkaline degreasing, water-rinsing, and hot-water rinsing. The surface roughness of the aluminum-based alloy is also adjusted. The spraying described in Patent Document 2 is carried out to form a coating layer subsequent to the surface cleaning and the adjusting of the surface roughness. Patent Document 3 describes the sliding properties of the aluminum bearing with the solid-lubricant overlay as follows. (a) The compatibility is better with the increase in the amount of solid lubricant in the solid-lubricant layer. (b) The seizure resistance is impaired when the thickness of a coating exceeds 10 μm. (c) The sliding properties of a thin coating layer are influenced by the surface roughness of the underlying aluminum alloy, when the coating layer becomes thin. Therefore, the seizure resistance is impaired.

Patent Document 4, Japanese Patent No. 3,133,209 proposes a solid-lubricant overlay, which consists of from 70 to 97% by mass of the solid lubricant selected from $MoS_2$, $WS_2$, BN, graphite and carbon fiber, and from 3 to 30% by mass of binder. This composition for forming the lubricant film contains a large proportion of the solid lubricant. The binder must hold a large proportion of the solid lubricant and therefore consists of polyimide based binder and compound having epoxy group. The composition for forming a lubricant film is applied on the surface of bearing alloy by spraying.

Patent Document 5, Japanese Unexamined Patent Publication (kokai) No.2002-53883 proposes a solid-lubricant overlay, which consists of polyamide-imide resin as well as solid lubricant and wear-resistant agent dispersed in the polyamide-imide resin. The polyamide-imide resin is characterized by having from 78.4 to 98 MPa of the tensile strength, from 1960 to 2940 MPa of the Young's modulus and from 10 to 20% of the elongation. This sliding member composition is suited for sliding member operated in lubricating oil, such as a piston skirt. The sliding member composition is sprayed to form a solid-lubricant overlay.

Patent Document 6, Japanese Unexamined Patent Publication (kokai) No. 2002-61652 proposes a solid-lubricant overlay consisting of from 70 to 30% by volume of thermo setting resin and from 30 to 70% by volume of solid lubricant (total of the thermosetting resin and the solid lubricant is 100% by volume). The thermosetting resin used in this overlay is soft and exhibits high elongation at high temperature. Specifically, the thermosetting resin exhibits from 70 to 110 MPa of tensile strength and from 7 to 20% of elongation at 25° C. and 15 MPa or more of tensile strength and 20% or more of elongation at 200° C. The solid-lubricant layer has Hv 20 or less of hardness. According to this proposal, soft thermosetting resin having high elongation at high temperature attains improved initial conformability at high speed. The solid-lubricant layer is prepared by the same method as in Patent Document 3. A method for forming the solid-lubricant overlay may be spraying and also roll transferring, tumbling, immersion, brush application, printing and the like.

The aluminum bearing with solid lubricant overlay proposed in Patent Document 7, Japanese Unexamined Patent Publication (kokai) No. 2004-263727 is the same as that proposed in Patent Document 6, except that the glass transition temperature of the resin is 150° C. or more.

The conventional copper-based sliding bearing alloys are mainly based on the Cu—Pb. Since Pb is environmental pollutant element, Cu—Bi based sliding bearing alloys, in which the Pb of the Cu—Pb alloy is replaced with Bi, have been proposed in for example, Patent Document 8, Japanese Unexamined Patent Publication (kokai) 56-142839, and Patent Document 9, Japanese Unexamined Patent Publication (kokai) No.11-29368, and Non-Patent Document 1, Tribologist (in Japanese) Vol. 51/No.6/2006, pages 456-462 "Current Conduction and Friction Characteristics of Copper-Based Sintered Alloy, in which Bi is Added".

Patent Document 1: Japanese Examined Patent Publication (kokoku) Hei 3-20451

Patent Document 2: Japanese Unexamined Patent Publication (kokai) No. Hei 4-83914

Patent Document 3: Japanese Patent No. 3733539
Patent Document 4: Japanese Patent No. 3133209
Patent Document 5: Japanese Unexamined Patent Publication (kokai) No.2002-53883
Patent Document 6: Japanese Unexamined Patent Publication (kokai) No. 2002-61652
Patent Document 7: Japanese Unexamined Patent Publication (kokai) No. 2004-263727
Patent Document 8: Japanese Unexamined Patent Publication (kokai) No. 56-142839
Patent Document 9: Japanese Unexamined Patent Publication (kokai) No. 11-293368
Non-Patent Document 1: Tribologist, Vol. 51/No.6/2006, pages 452-462 "Current Conducting and Friction Properties of Copper-Based Sintered Alloy with Bi Addition"
Non-Patent Document 2: Tribologist Vol 50/No.9/2005, page 664 "Reviewing Fifty Years of Engine Bearings, Usually Referred to as Metal"

DISCLOSURE OF INVENTION

Problems to be Solved by Invention

Non-Patent Document 2, Tribologist Vol. 50/No.9/2005, page 664 "Reviewing Fifty Years of Engine Bearing, Usually Referred to as Metal" illustrates how engines with 1500 cc of displacement have been changed in 40 years from 1960 to 2000. Specifically, the weight of an engine has been decreased from approximately 170 kg to approximately 100 kg. Meanwhile, the output has been increased from approximately 50 PS to approximately 100 PS. Consequently, the load of a bearing has been increased from approximately 1 $PS/cm^2$ to approximately 5 $PS/cm^2$. Evidently, the engines having displacement different from 1500 cc have been and are being weight reduced and operated under higher load even in the period later than 2000. A number of the technical developments have been accomplished in the period of 40 years, so as to improve the sliding properties adaptable to the conditions of high circumferential speed and high surface pressure Recently, low-viscosity engine oil, such as modified 5W-20 and 0W-20 oils is also practically used for ordinary passenger vehicles. The fuel consumption is thus decreased, while the thickness of the oil film is decreased.

As is shown in Patent Documents 3-7, a number of proposals are directed to improve the solid-lubricant overlay. However, the properties of the improved solid-lubricant overlay turned out to be not good as expected when the solid-lubricant overlay is operated under the conditions of high circumferential speed and high surface pressure. The seizure therefore occurs.

Low frictional property and compatibility are general properties of the solid lubricant. Meanwhile, the solid lubricant is very liable to slide in a particular crystallographic direction. This property is utilized for low frictional property and compatibility. When the particles of the solid lubricant are subjected to load from an opposite shaft, the sliding along the particular crystallographic plane occurs. The particles of solid lubricant are therefore deformed and destroyed, with the result that the solid-lubricant coating layer as a whole flows. The low frictional property and compatibility of the solid-lubricant layer is attributable to the flow described above. The sliding along the particular crystallographic plane of the solid lubricant occurs no matter which direction the particles of the solid lubricant orient in the solid-lubricant coating layer. The low frictional property and compatibility should, therefore, be independent upon the orientation of the solid-lubricant particles. However, actually, the sliding properties are not as good as expected, when the sliding member is operated under the condition of high circumferential speed and the high surface pressure.

The present applicant energetically continues to improve bearings with a solid lubricant overlay. Meanwhile, the present applicant discovered when the sliding conditions are under high circumferential speed and surface pressure that seizure resistance is dependent upon crystallographic orientation of the solid lubricant.

It is, therefore, an object of the present invention to fully demonstrate the properties of a solid-lubricant coating layer applied on an aluminum or copper based alloy of a sliding member.

Means for Solving a Problem

In a sliding member according to the present invention, a resin based coating comprising solid lubricant dispersed therein is provided on an aluminum or copper based alloy layer. The sliding member according to the present invention is characterized in that the solid lubricant exhibits 85% or more of the relative C axis intensity ratio defined below.

A sliding member according to the present invention comprises an aluminum or copper based alloy layer and a resin based coating comprising solid lubricant, characterized in that the solid lubricant exhibits 85% or more of the relative C axis intensity ratio defined below.

The relative C axis intensity ratio=the accumulative intensities of (002), (004) and (008) planes relative to the accumulative intensities of (002), (004), (100), (101), (102), (103), (105), (110) and (008) planes detected by X ray diffraction.

The present invention is described hereinafter more in detail.

Kind, thickness, composition, thickness, and coating thickness of the aluminum-based bearing alloy, the copper-based bearing alloy, the solid lubricant and the resin used in the sliding member according to the present invention are known. The solid lubricant slides along a particular crystallographic plane, no matter which direction the particles of the solid lubricant orient in the solid-lubricant coating layer. In other words, fundamental crystal structure of a solid lubricant is such that it easily cleaves along a particular crystallographic orientation and exhibits a low frictional property. However, the sliding properties are not good as expected, when the circumferential speed and surface pressure are high. The present invention is therefore characterized in that the relative C axis intensity ratio of the solid lubricant defined by the equation mentioned hereinabove is set so high that sliding properties are enhanced.

BEST MODE FOR CARRYING OUT THE INVENTION

Figure 1:
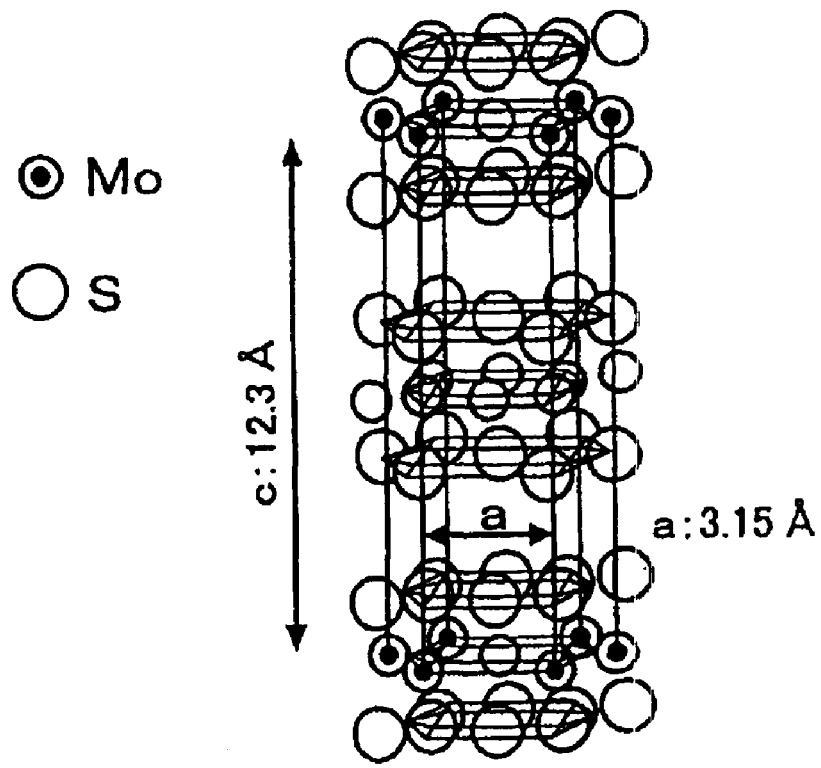
FIG. 1 shows a crystal structure of $MoS_2$.

The structure of solid lubricant used in the sliding member of the present invention is described more in detail. The crystals of solid lubricant are arranged in the form of laminar network structures, which are superimposed on one another. The atomic force between the superimposed atoms determines the distance between each laminar network. FIG. 1 shows the crystal structure of $MoS_2$. Since sliding occurs between the crystal layers of the solid lubricant, the coefficient of friction is very low.

In the $MoS_2$ crystal structure shown in FIG. 1, a hexagonal network of Mo(B) and a hexagonal network of S(A) are mutually superimposed on one another. One hexagonal network Mo (B) is, therefore, sandwiched between a pair of hexagonal networks S (A). One unit (A-B-A) therefore forms $MoS_2$. A distance between the hexagons extends in the direction of the a axis A distance between A-A extents in the direction of the c axis. The crystallographic plane of the c axis is (001). The (001) plane is detected by the X ray diffraction as (002), (004) and (008), which are multiplication of (001) by integer. The axis of A-B-A unit is perpendicular to (001) plane.

The standard sample of $\beta$ $MoS_2$ No.37-1492 stipulated in JCPDS card has 45.8% of the relative C axis intensity ratio defined above.

Figure 2:
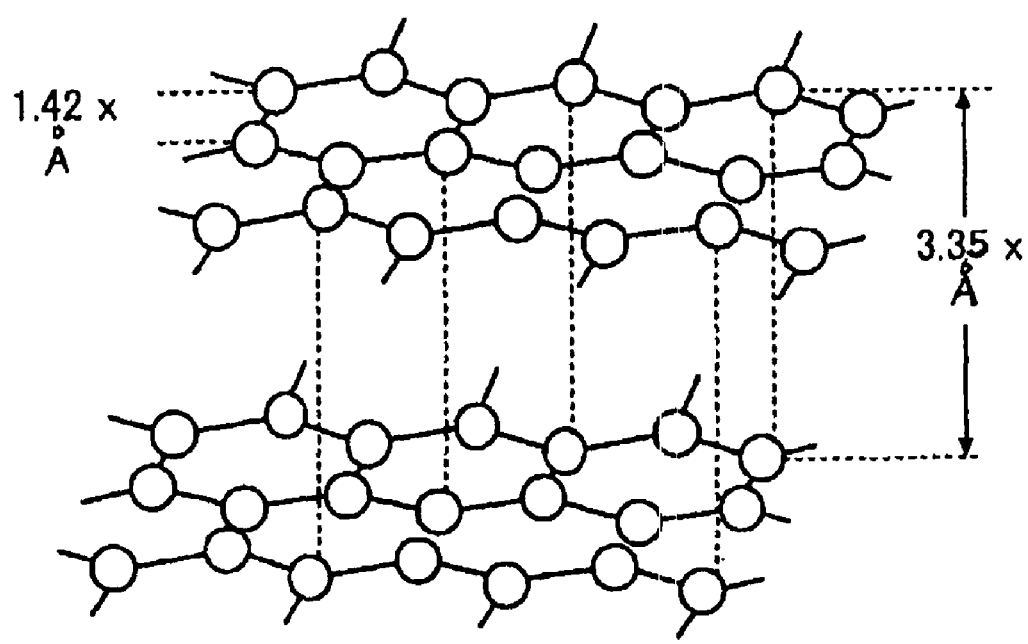
FIG. 2 shows a crystal structure of graphite

Meanwhile, the graphite shown in FIG. 2 has a=1.42 Å and c=3.35 Å. The graphite has a crystal structure A-A, that is, B of the A-B-A mentioned above lacks. The standard sample of graphite No.23-0064 stipulated in JCPDS card has 63.3% of the relative C axis intensity ratio mentioned above with regard to $MoS_2$.

Figure 3:
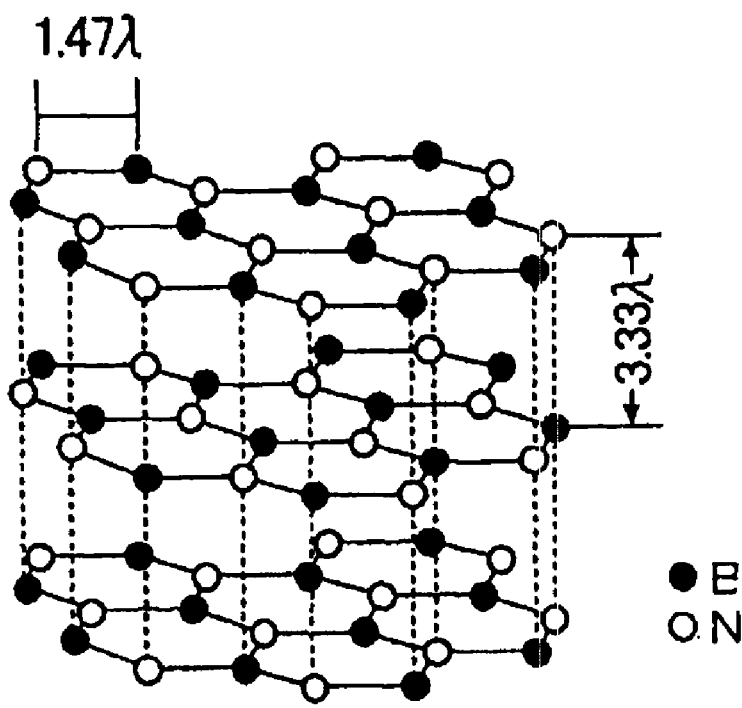
FIG. 3 shows a crystal structure of h-BN.

In the crystal of h-BN shown in FIG. 3, three B atoms and three N atoms are mutually arranged to form one hexagonal arrangement. One side of this hexagonal arrangement has a length of a=1.47 Å. The hexagonal arrangement extends two dimensionally such that each one side mentioned above is common to neighboring two hexagons. This hexagonal arrangement is repeated to form a net work. A distance between the networks in the direction of c axis is 3.33 Å. The standard sample of h-BN No.34-0421 stipulated in JCPDS card has 74.3% of the relative C axis intensity ratio mentioned above.

The relative C axis intensity ratio of $MoS_2$ standard sample is lower than those of the graphite and h-BN. This seems to be a reason for the fact that the sliding properties of the $MoS_2$-containing coating layer can be improved remarkably as compared with those of h-BN and graphite by means of increasing the relative C axis intensity ratio.

Figure 4:
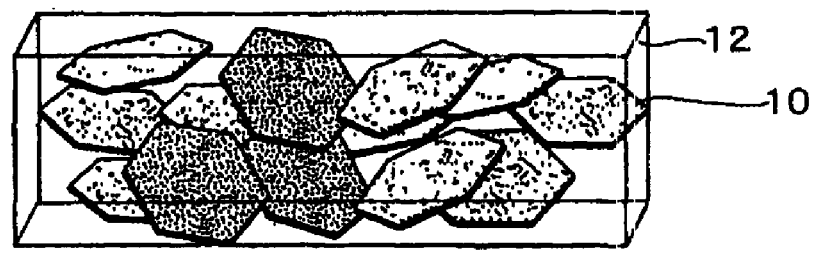
FIG. 4 schematically shows the orientation of the solid lubricant in the solid lubricant overlay.
Figure 5:
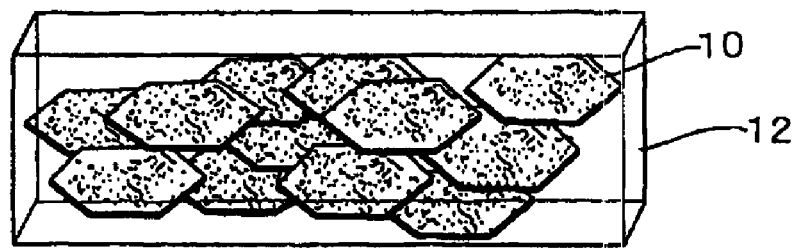
FIG. 5 schematically shows the orientation of the solid lubricant in the solid lubricant overlay.

FIGS. 4 and 5 schematically illustrate how the particles of solid lubricant are oriented in the solid-lubricant overlay. The solid lubricant 10 is illustrated as hexagonal shaped thin plates. Each hexagonal thin plate of the solid lubricant has the A-B-A structures mentioned above, which are superimposed on one another. In FIG. 4, the <002> axis is aslant by from a few to approximately 30° relative to the direction perpendicular to the coating surface. Contrary to this, in FIG. 5, the <002> axis of all of the solid-lubricant particles is oriented perpendicular to the coating surface. Note that FIG. 5 is only for the illustration purpose, because it is impossible to orient all of the solid lubricant particles in a direction perpendicular to the coating surface.

The distance between (002) planes of $MoS_2$ is 12.3 Å. The wave length ($\lambda$) of Cu $K_\alpha$ ray, which is usually used in the X ray diffraction, is 1.54 Å. When these values are inserted in the Bragg's diffraction equation ($n\lambda=2$ d sin $\theta$), the obtained diffraction angle ($2\theta$) is 14.4°. In the case of the orientation as illustrated in FIG. 5, the diffraction from the (002) planes forms a sharp and strong peak having center at $2\theta=14.4°$. On the other hand, in the case of orientation shown in FIG. 4, the diffraction peaks disperse greatly away from 14.4° and the peak intensity is very low.

Figure 6:
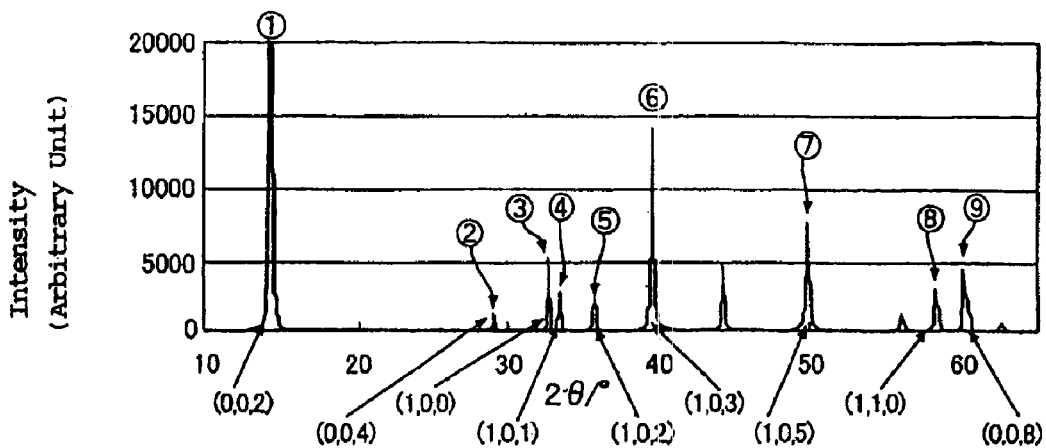
FIG. 6 is an X-ray diffraction chart showing 88% of the relative C axis intensity ratio.

With regard to the other planes, i.e., (004), (100), (101), (102), (103), (105), (110) and (008) planes, the diffraction angle $2\theta$ can be obtained by the same method. FIG. 6 shows an X ray diffraction pattern of the solid-lubricant layer, in which $MoS_2$ is dispersed and which has 88% of the relative C axis intensity ratio. The intensity of diffraction from the other planes mentioned above is shown in FIG. 6. The diffraction peak from the planes other than nine planes mentioned above may occasionally be obtained, but the intensity of the peaks is extremely low. The diffraction peaks of these other planes can, therefore, be neglected in the calculation of the relative C axis intensity ratio.

The (002), (004) and (008) planes among the nine planes mentioned above correspond to the cleavage planes. It can, therefore, be said that when the relative intensity of these three planes is high, the orientation of solid lubricant is close to that shown in FIG. 5. Even if the orientation attained is "vertical" as shown in FIG. 5, since the X ray necessarily deflects from the six planes other than the cleavage plane, the relative C axis intensity ratio cannot arrive at 100%. The orientation can be made close to the "vertical" by the method for forming a solid-lubricant layer under the conditions described hereinbelow. Nevertheless, the highest attainable relative C axis intensity ratio seems at the present time to be 90% or slightly higher than 90%.

The solid-lubricant coating layer of a sliding member may be worn out to such an extent that the underlying layer or the bearing alloy of the sliding member is exposed. The properties of a solid-lubricant coating layer are, therefore, influenced by the orientation of the solid lubricant in the entire thickness of the solid-lubricant coating layer. In this regard, the power of the ordinary X ray diffraction apparatus with the use of the $CuK_\alpha$ ray, is at the level of approximately 40 kV-100 mA. The X ray having the power level mentioned above can penetrate onto the aluminum alloy or copper alloy of a substrate. The diffraction peaks from such alloy should be omitted in the evaluation of orientation of the solid lubricant. The orientation of solid-lubricant particles, which exerts an influence upon the siding properties, can thus be measured.

In order to measure the relative C axis intensity ratio of semi-circular bearing pairs of an engine bearing, a half semi-circular part is to be cut into an appropriate size, and the cut piece is re-deformed into a flat shape. This flat test piece is subjected to the X ray diffraction. This method belongs to a destructive inspection. A non-destructive inspective method is possible, when a sheet form specimen, which have been produced under the same conditions as in the production of an engine baring, is available. When the sheet form specimen is subjected to the X ray diffraction, the exactly same diffraction as that obtained from an engine bearing, can be obtained. When the sheet form specimen is bent into a semi circular shape of an engine bearing, although the solid lubricant is also subjected to the bending force, since the solid lubricant is firmly bonded by the binder resin, the orientation of the solid lubricant does not change at all by the bending. Material in the sheet form can, therefore provide the exactly same diffraction as that of the final product.

Figure 7:
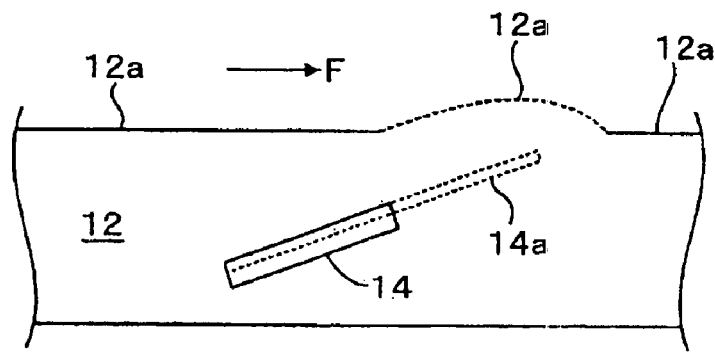
FIG. 7 schematically shows the sliding circumstance in a case where the orientation of the solid lubricant in the solid-lubricant overlay is as shown in FIG. 4.
Figure 8:
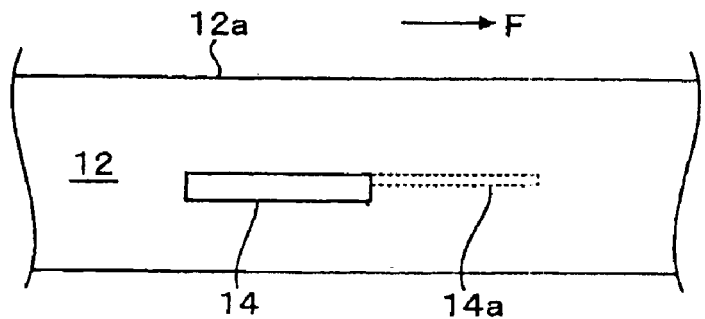
FIG. 8 schematically shows the sliding circumstance in a case where the orientation of the solid lubricant in the solid-lubricant overlay is as shown in FIG. 5.

It is now explained with reference to FIGS. 7 and 8 how the orientation defined by the present invention exerts an influence upon the sliding properties. FIG. 7 shows that a $MoS_2$ particle 14 is aslant with respect to the surface 12a of the solid-lubricant layer 12. The rotation force F of the opposite shaft cleaves the $MoS_2$ particle 14 and the cleaved piece 14a is formed. As a result, the surface 12a of the solid-lubricant layer swells in the form of 12a'. FIG. 8 shows that a $MoS_2$ particle 14 is arranged in the solid-lubricant layer 12 parallel to the external force, that is, the rotational force F. The cleaved piece 14a of a $MoS_2$ particle 14 does not form a convex surface of the solid-lubricant layer. The fluid lubrication can, therefore, be maintained even if the lubricating oil film becomes thin under the conditions of high circumferential speed and high pressure. As a result, the seizure resistance can be enhanced.

The coating layer is preferably from 2 to 10 μm thick, more preferably from 4 to 8 μm thick in the light of excellent sliding properties. Thickness of the solid-lubricant layer may exert influence upon the adhesion strength with a substrate material, the strength of the coating for itself, heat conductivity and the like. The sliding properties are in turn influenced by the adhesion strength and the like.

The method for forming the solid-lubricant layer is described hereinafter.

Generally speaking, the starting material of the solid lubricant layer used preferably has 10 or more of the aspect ratio (this is a value of the root square of the surface are of a thin piece divided by its thickness). The solid lubricant in the form of thin pieces in a proportion of from 30 to 70% by volume is mixed with the resin in balance. Diluting agent is added to the mixture. Proportion of the solid matter in the prepared paint according to the present invention should be less than that in the prior art. In other words, the solid-lubricant particles are less mutually in contact with one another by decreasing the proportion of the solid matter. The solid lubricant particles are, therefore, more likely to be oriented perpendicularly as shown in FIG. 5. If the solid lubricant layer, in which the proportion of the solid matter is few, is not satisfactorily thick, the wet on wet coating is carried out.

When paint is applied on the surface of bearing alloy, any one of the pad printing, screen printing, air spraying, air-less spraying, electrostatic coating, tumbling, squeezing and rolling and the like, is employed under the conditions to enhance the relative C-axis intensity ratio. The wet on wet coating of a low viscosity paint can be commonly employed to every one of these methods.

The applied paint is, then, dried. During the drying process, a large proportion of the solvent components vaporizes from the low-viscosity paint and resin of the paint undergoes shrinkage. During such vaporization and shrinkage, the particles of solid lubricant displace while slightly inclining in the coating layer. The particles of solid lubricant are, therefore, liable to be randomly oriented. It is, therefore, necessary to retard the vaporization speed of solvent to a level as slow as possible in the vaporization process. For example, preferably, the intermediate product, on which the paint is applied, is dried at room temperature, and, subsequently, the drying temperature is gradually elevated to a level of the baking temperature of resin. Surface thickness of the solid-lubricant layer is preferably 5 μm or less of Rz.

Bearing alloy used for a sliding bearing may be exposed as the compatible action of the solid-lubricant overlay proceeds. Since the bearing alloy is, then, caused to slide on the opposite shaft, a satisfactory level of the bearing properties is necessary for the bearing alloy. Composition of the bearing aluminum alloy is not particularly limited. Preferable aluminum-alloys contains 10% by mass or less of one or more of Cr, Si, Mn, Sb, Sr, Fe, Ni, Mo, Ti, W, Zr, V, Cu, Mg and Zn, and 20% by mass or less of one or more of Sn, Pb, In, Tl and Bi. The elements of the former group mainly imparts to the aluminum alloy the strength and wear resistance, while the elements of the latter group mainly imparts to the aluminum alloy the compatibility. The bearing properties of an aluminum alloy are dependent upon kind and amount of the additive elements. The bearing alloy described above is an example of the bearing member. The skirt of a piston is made of high Si—Al alloy, for example, AC8A and AC9B. The solid-lubricant layer according to the present invention may be applied on the underlying high Si—Al alloy so as to enhance the wear resistance of the piston skirt.

The composition of copper alloy is not particularly limited. Preferable copper alloy contains 25% by mass or less of one or more elements of Pb and Bi, 10% by mass or less of Sn, and 2% by mass or less of one or more of P, Ag, In, Ni, and Al. In these elements, Pb and Bi are soft metal and impart to the Cu alloy the compatibility. Sn is a basic component of the bronze and imparts to the Cu alloy the strength and the wear resistance. The other elements improve these properties in auxiliary manner as follows. P among these elements is effective for deoxidization, promoting the sintering, strengthening and the like. Ag forms together with S, which is contained in the lubricating oil and is also an impurity of the copper, a compound, which is effective for enhancing the sliding properties. In improves the corrosion resistance and the wettability of the Cu alloy by the lubricating oil. Ni and Al are effective for strengthening the copper alloy.

The bearing alloy is usually approximately 0.3 mm thick. The backing metal, which firmly supports the bearing alloy is usually approximately 1.2 mmm thick.

Preferably, polyimide resin, polyamide imide resin, epoxy resin, polyimide bendazole resin are used as the binder resin. Resins proposed in Patent Document Nos. 5-7 can also be used. The present invention is hereinafter described more in detail with reference to an example.

EXAMPLE 1

The constituent elements of a sliding member tested are as follows: backing steel (SPCC); aluminum-based bearing alloy (Al-11.5% Sn-1.8% Pb-1.0% Cu-3.0% Si-0.3% Cr) pressure-bonded on the backing steel; 6 μm thick solid-lubricant layer air-sprayed on the bearing alloy and baked at 180° C. for 1 hour. The solid-lubricant layer consisted of 35% by mass of $MoS_2$ and 50% by mass of organic diluting agent (NMP) and balance of polyamide-imide resin.

The seizure resistance test was carried out in the following condition, which simulates that the sliding bearing is mounted on a connecting rod of the internal combustion engine of an automobile.

Figure 9:
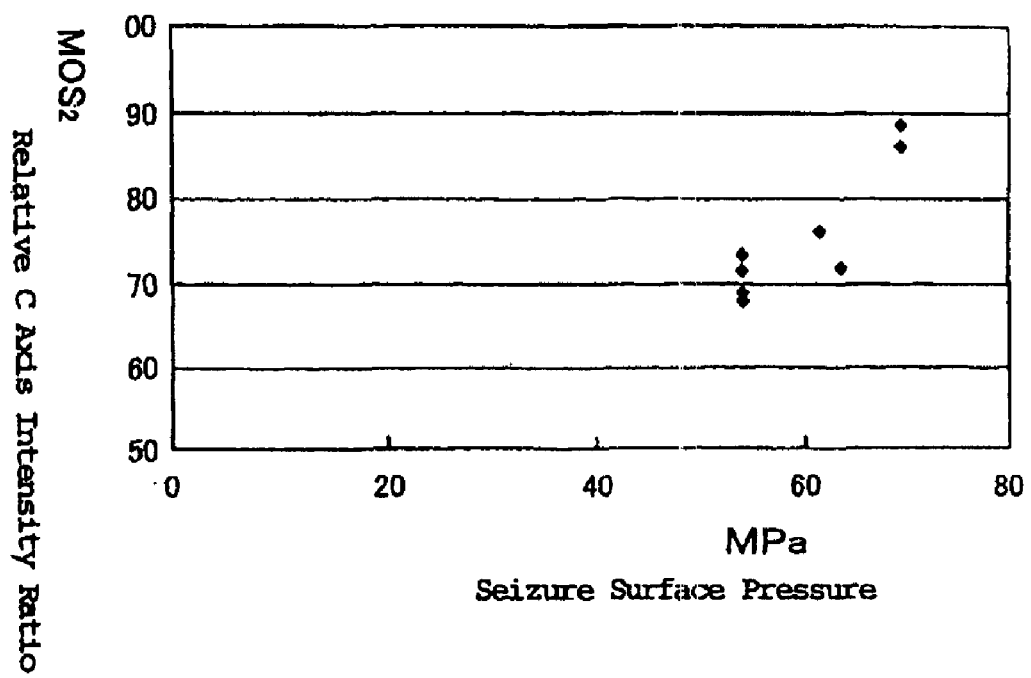
FIG. 9 is a graph showing a relationship between the relative C axis intensity ratio and the seizure resistance.

Testing Method of Seizure Resistance
Tester: static load evaluating tester of a bearing
Opposite shaft: forged shaft
Sliding speed (rotational circumferential speed of the opposite shaft): 20 m/s
Lubricating oil: engine oil 0W-20
Lubricating method: forced feeding of oil
Oil temperature: 60° C.
Method for applying load: stepwise increase by 4.3 MPa/3 minutes FIG. 9 shows the testing results. As is clear from FIG. 9, the seizure resistance is higher as the relative C-axis intensity ratio is higher. FIG. 6 is an X-ray chart of the example showing 88% of the relative C-axis intensity ratio.

INDUSTRIAL APPLICABILITY

As is described hereinabove, the sliding member according to the present invention has improved seizure resistance under high speed and high surface pressure. Performance of the sliding parts can, therefore, be enhanced.

The invention claimed is:

1. A sliding member, wherein a resin based coating comprising solid lubricant dispersed therein is provided on an aluminum or copper based alloy layer, characterized in that the solid lubricant exhibits a relative C axis intensity ratio, as defined below, of 85% or more, relative C axis intensity ratio=the accumulative intensity of (002), (004) and (008) planes relative to the accumulative intensity of (002), (004), (100), (101), (102), (103), (105), (110) and (008) planes detected by X ray diffraction.

2. A sliding member according to claim 1, wherein the solid lubricant is $MoS_2$.

* * * * *